(12) United States Patent
Kamata et al.

(10) Patent No.: US 7,898,768 B2
(45) Date of Patent: Mar. 1, 2011

(54) PATTERNED MEDIUM WITH MAGNETIC PATTERN DEPTH RELATIONSHIP

(75) Inventors: Yoshiyuki Kamata, Tokyo (JP); Masatoshi Sakurai, Tokyo (JP); Satoshi Shirotori, Fuchu (JP); Kaori Kimura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 913 days.

(21) Appl. No.: 11/724,328

(22) Filed: Mar. 15, 2007

(65) Prior Publication Data

US 2007/0217075 A1 Sep. 20, 2007

(30) Foreign Application Priority Data

Mar. 16, 2006 (JP) .................. 2006-072857

(51) Int. Cl.
 *G11B 5/82* (2006.01)
(52) U.S. Cl. .......................... 360/135; 428/842
(58) Field of Classification Search .................. 360/135; 428/834, 842, 844, 844.1, 844.2, 844.3, 844.4
See application file for complete search history.

(56) References Cited

U.S. PATENT DOCUMENTS

| | | | |
|---|---|---|---|
| 3,627,330 A | 12/1971 | Dimitracopoulos | |
| 4,396,479 A | 8/1983 | Jones | |
| 4,647,494 A | 3/1987 | Meyerson et al. | |
| 4,701,374 A | 10/1987 | Sagoi et al. | |
| 4,935,278 A | 6/1990 | Krounbi et al. | |
| 5,192,697 A | 3/1993 | Leong | |
| 5,402,278 A | 3/1995 | Morita | |
| 5,535,069 A | 7/1996 | Chiao et al. | |
| 5,766,718 A | 6/1998 | Matsuda et al. | |
| 5,771,131 A | 6/1998 | Pirzadeh | |
| 5,772,905 A | 6/1998 | Chou | |
| 5,943,180 A | 8/1999 | Seo et al. | |
| 6,153,281 A | 11/2000 | Meyer et al. | |
| 6,168,845 B1 | 1/2001 | Fontana et al. | |
| 6,254,966 B1 | 7/2001 | Kondo | |
| 6,331,364 B1 | 12/2001 | Baglin et al. | |
| 6,365,012 B1 | 4/2002 | Sato et al. | |
| 6,388,865 B1 | 5/2002 | Honda et al. | |
| 6,426,845 B1 | 7/2002 | Sacks et al. | |

(Continued)

FOREIGN PATENT DOCUMENTS

CN 1360304 7/2002

(Continued)

OTHER PUBLICATIONS

Hattori et al., *Fabrication of Discrete Track Perpendicular Media for High Recording Density*, IEEE Transactions on Magnetics, vol. 40, No. 4, Jul. 2004, pp. 2510-2515.

(Continued)

*Primary Examiner* — Craig A. Renner
(74) *Attorney, Agent, or Firm* — Nixon & Vanderhye, PC (57) ABSTRACT

A patterned media has a substrate, and a magnetic recording layer on the substrate including protruded magnetic patterns and a nonmagnetic material filled in between the protruded magnetic patterns. In the patterned media, a depth $D_b$ and a depth $D_a$, which are defined that $D_b$ is a depth from a surface of the magnetic patterns to a surface of the nonmagnetic material filled in a first central part between the magnetic patterns adjacent to each other in a cross-track direction or a down-track direction, and $D_a$ is a depth from a surface of the magnetic patterns to a surface of the nonmagnetic material filled in a second central part in a portion surrounded by the magnetic patterns, have a relationship that the depth $D_a$ is greater than the depth $D_b$.

8 Claims, 7 Drawing Sheets

U.S. PATENT DOCUMENTS

| | | |
|---|---|---|
| 6,469,852 B1 | 10/2002 | Nakagawa |
| 6,509,108 B2 | 1/2003 | Okuyama et al. |
| 6,542,339 B1 | 4/2003 | Sasaki et al. |
| 6,577,493 B2 | 6/2003 | Honda et al. |
| 6,602,620 B1 | 8/2003 | Kikitsu et al. |
| 6,611,420 B2 | 8/2003 | Honda et al. |
| 6,641,935 B1 | 11/2003 | Li et al. |
| 6,689,495 B1 | 2/2004 | Sato et al. |
| 6,704,190 B2 | 3/2004 | Honda et al. |
| 6,751,035 B1 | 6/2004 | Belser |
| 6,753,043 B1 | 6/2004 | Kuo et al. |
| 6,753,130 B1 | 6/2004 | Liu et al. |
| 6,875,492 B1 | 4/2005 | Pirzada et al. |
| 7,209,413 B2 | 4/2007 | Van Der et al. |
| 7,323,258 B2 | 1/2008 | Kamata et al. |
| 7,345,838 B2 | 3/2008 | Sakurai et al. |
| 7,388,725 B2 | 6/2008 | Sakurai et al. |
| 7,572,528 B2 | 8/2009 | Yamamoto et al. |
| 7,580,223 B2 | 8/2009 | Sakurai et al. |
| 7,662,264 B2 | 2/2010 | Shirotori et al. |
| 7,782,562 B2 | 8/2010 | Kamata et al. |
| 2001/0048566 A1 | 12/2001 | Hirano et al. |
| 2002/0081461 A1 | 6/2002 | Nishikawa et al. |
| 2002/0142192 A1 | 10/2002 | Kamata et al. |
| 2002/0182443 A1 | 12/2002 | Ohkubo |
| 2003/0035973 A1 | 2/2003 | Trindade et al. |
| 2003/0112560 A1 | 6/2003 | Takeshita et al. |
| 2003/0117736 A1 | 6/2003 | Niitsuma et al. |
| 2004/0050480 A1 | 3/2004 | Angelo et al. |
| 2004/0091748 A1 | 5/2004 | Kamata et al. |
| 2004/0101713 A1 | 5/2004 | Wachenschwanz et al. |
| 2004/0166372 A1 | 8/2004 | Haginoya et al. |
| 2004/0191577 A1 | 9/2004 | Suwa et al. |
| 2004/0247945 A1 | 12/2004 | Chen et al. |
| 2004/0253817 A1 | 12/2004 | Imada et al. |
| 2004/0257687 A1 | 12/2004 | Ishida et al. |
| 2005/0028184 A1 | 2/2005 | Takemoto et al. |
| 2005/0045583 A1 | 3/2005 | Fujita et al. |
| 2005/0069732 A1 | 3/2005 | Kamata et al. |
| 2005/0117253 A1 | 6/2005 | Moriya et al. |
| 2005/0213239 A1 | 9/2005 | Hibi et al. |
| 2005/0219730 A1 | 10/2005 | Sakurai et al. |
| 2005/0233176 A1 | 10/2005 | Takai et al. |
| 2005/0282038 A1 | 12/2005 | Yamamoto et al. |
| 2005/0282379 A1 | 12/2005 | Saito et al. |
| 2006/0012913 A1 | 1/2006 | Nakamura et al. |
| 2006/0014053 A1 | 1/2006 | Asakura et al. |
| 2006/0028750 A1 | 2/2006 | Sakurai et al. |
| 2006/0076509 A1 | 4/2006 | Okino et al. |
| 2006/0132953 A1 | 6/2006 | Asakura et al. |
| 2006/0215306 A1 | 9/2006 | Ehrlich et al. |
| 2006/0222897 A1 | 10/2006 | Kamata et al. |
| 2006/0280861 A1 | 12/2006 | Shirotori et al. |
| 2007/0003793 A1 | 1/2007 | Sakurai et al. |
| 2007/0026265 A1 | 2/2007 | Sakurai et al. |
| 2007/0070547 A1 | 3/2007 | Kamata et al. |
| 2007/0190365 A1 | 8/2007 | Kodama et al. |

FOREIGN PATENT DOCUMENTS

| | | |
|---|---|---|
| CN | 1558399 | 12/2004 |
| CN | 1637870 | 7/2005 |
| EP | 0 183 427 | 6/1986 |
| EP | 0 339 813 | 11/1989 |
| EP | 0 339 851 | 11/1989 |
| EP | 0 459 265 | 12/1991 |
| EP | 0 468 778 | 1/1992 |
| EP | 0 538 887 | 4/1993 |
| EP | 1463038 | 9/2004 |
| JP | 58-118028 | 7/1983 |
| JP | 62-232720 | 10/1987 |
| JP | 62-256225 | 11/1987 |
| JP | 02-232816 | 9/1990 |
| JP | 2-301018 | 12/1990 |
| JP | 3-142707 | 6/1991 |
| JP | 04-001922 | 1/1992 |
| JP | 04-113515 | 4/1992 |
| JP | 5-62148 | 3/1993 |
| JP | 05-258291 | 10/1993 |
| JP | 06-028650 | 2/1994 |
| JP | 06-036263 | 2/1994 |
| JP | 06-076278 | 3/1994 |
| JP | 06-139567 | 5/1994 |
| JP | 07-085406 | 3/1995 |
| JP | 07-153047 | 6/1995 |
| JP | 08-069614 | 3/1996 |
| JP | 08-115519 | 5/1996 |
| JP | 08-241512 | 9/1996 |
| JP | 08-255340 | 10/1996 |
| JP | 09-97419 | 4/1997 |
| JP | 09-245345 | 9/1997 |
| JP | 10-334460 | 12/1998 |
| JP | 11-161943 | 6/1999 |
| JP | 11-161944 | 6/1999 |
| JP | 11-273059 | 10/1999 |
| JP | 11-274152 | 10/1999 |
| JP | 11-348048 | 12/1999 |
| JP | 2000-211082 | 8/2000 |
| JP | 2000-269330 | 9/2000 |
| JP | 2000-306227 | 11/2000 |
| JP | 2001-189006 | 7/2001 |
| JP | 2001-273682 | 10/2001 |
| JP | 3271406 | 4/2002 |
| JP | 2002-288813 | 10/2002 |
| JP | 2003-016621 | 1/2003 |
| JP | 2003-016622 | 1/2003 |
| JP | 2003-100609 | 4/2003 |
| JP | 2003-109213 | 4/2003 |
| JP | 2003-155365 | 5/2003 |
| JP | 2003-248918 | 9/2003 |
| JP | 2004-164692 | 6/2004 |
| JP | 3576220 | 7/2004 |
| JP | 2004-288250 | 10/2004 |
| JP | 2004-295989 | 10/2004 |
| JP | 2004-295991 | 10/2004 |
| JP | 2004-335011 | 11/2004 |
| JP | 2005-011459 | 1/2005 |
| JP | 2005-56535 | 3/2005 |
| JP | 2005-243131 | 9/2005 |
| JP | 2005-276325 | 10/2005 |
| JP | 2005-293633 | 10/2005 |
| JP | 2006-048861 | 2/2006 |
| WO | 02/23538 | 3/2002 |
| WO | 2006-019063 | 2/2006 |

OTHER PUBLICATIONS

U.S. Appl. No. 11/527,458, filed Sep. 27, 2006, First Inventor: Yoshiyuki Kamata.
Office Action in Japanese Application No. 2006-072857, dated May 12, 2009 and English-language translation.
Office Action in Japanese Patent Application No. 2006-072857, dated Apr. 20, 2010, and English-language translation.
Sakurai et al., U.S. Appl. No. 11/087,595, filed Mar. 24, 2005.
Sakurai et al., U.S. Appl. No. 11/197,535, filed Aug. 5, 2005.
Kamata et al., U.S. Appl. No. 11/371,901, filed Mar. 10, 2006.
Shirotori et al., U.S. Appl. No. 11/406,502, filed Apr. 19, 2006.
Sakurai et al., U.S. Appl. No. 11/475,874, filed Jun. 28, 2006.
Sakurai et al., U.S. Appl. No. 11/493,652, filed Jul. 27, 2006.

PATTERNED MEDIUM WITH MAGNETIC PATTERN DEPTH RELATIONSHIP

CROSS-REFERENCE TO RELATED APPLICATIONS

This application is based upon and claims the benefit of priority from prior Japanese Patent Application No. 2006-072857, filed Mar. 16, 2006, the entire contents of which are incorporated herein by reference.

BACKGROUND OF THE INVENTION

1. Field of the Invention

The present invention relates to a patterned media and a method of manufacturing the same, and a magnetic recording apparatus provided with the patterned media.

2. Description of the Related Art

In recent years, a problem that improvement in track density in magnetic recording media installed in hard disk drives (HDD) is prevented because of interference between adjacent tracks has become obvious. In particular, to reduce a fringing effect of magnetic fields from a magnetic head has become an important technical problem.

With respect to such a problem, a discrete track recording type patterned media (DTR media) in which recording tracks are physically separated has been proposed. In the DTR media, because a side-erase phenomenon that information on adjacent tracks is erased at the time of recording and a side-read phenomenon that information on adjacent tracks is read out at the time of reproducing can be reduced, it is possible to increase the track density. Accordingly, the DTR media have been expected as magnetic recording media which can provide a high recording density.

Conventionally, a DTR media is manufactured by a method comprising: etching a ferromagnetic layer deposited on a substrate to form magnetic patterns such as recording tracks or the like, filling a nonmagnetic material such as $SiO_2$ in recesses between the magnetic patterns by bias sputtering, and etching-back the nonmagnetic material to flatten the surface of the media (see IEEE Trans. Magn., Vol. 40, pp. 2510 (2004)).

The reason of using such a method is because it has been believed that the flying characteristics of a magnetic head are made unstable when the depths of recesses on the surface thereof are too great. Thus, the problem that the flying characteristics of the head are made unstable is solved by flattening the surface by filling a nonmagnetic material in the recesses between the magnetic patterns.

However, when the surface of the DTR media is flattened, a flying height of the magnetic head is made greater, which brings about the problem that a signal-to-noise ratio (SNR) of burst signals is lowered. Further, in the case where the surface of the DTR media is flat, there is also a problem that, at the time of a crash of the magnetic head against the surface of the media (head crash), the lubricant is easily lost from the surface of the media and the media is damaged, which makes the life of the drive short.

BRIEF SUMMARY OF THE INVENTION

According to an aspect of the present invention, there is provided a patterned media comprising: a substrate; and a magnetic recording layer on the substrate including protruded magnetic patterns and a nonmagnetic material filled in between the protruded magnetic patterns, a depth $D_b$ and a depth $D_a$, which are defined that $D_b$ is a depth from a surface of the magnetic patterns to a surface of the nonmagnetic material filled in a first central part between the magnetic patterns adjacent to each other in a cross-track direction or a down-track direction, and $D_a$ is a depth from a surface of the magnetic patterns to a surface of the nonmagnetic material filled in a second central part in a portion surrounded by the magnetic patterns, having a relationship that the depth $D_a$ is greater than the depth $D_b$.

According to another aspect of the present invention, there is provided a method of manufacturing a patterned media comprising: depositing a magnetic film on a substrate, followed by applying a resist to the magnetic film; pressing a stamper, on which recessed patterns are formed corresponding to the protruded magnetic patterns of the above patterned media, to the resist to form protruded resist patterns corresponding to the magnetic patterns; etching the magnetic film using the protruded resist patterns as masks to form protruded magnetic patterns, followed by removing the resist patterns; depositing a nonmagnetic material to be filled in between the magnetic patterns by sputtering without applying a substrate bias; and etching-back the nonmagnetic material.

DETAILED DESCRIPTION OF THE INVENTION

Figure 1A:
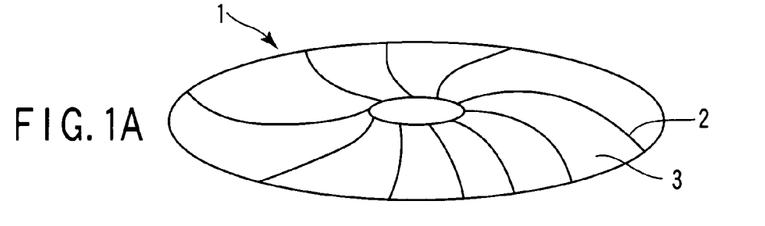
FIG. 1A is a plan view of a patterned media according to an embodiment.

FIG. 1A shows a plan view of a patterned media according to an embodiment. As shown in FIG. 1A, a plurality of servo areas 2 in a form of circular arc are formed on a magnetic disk 1 between the inner peripheral portion and the outer peripheral portion of the magnetic disk 1. Areas between the servo areas 2 are used as data areas 3 including recording tracks.

Figure 1B:
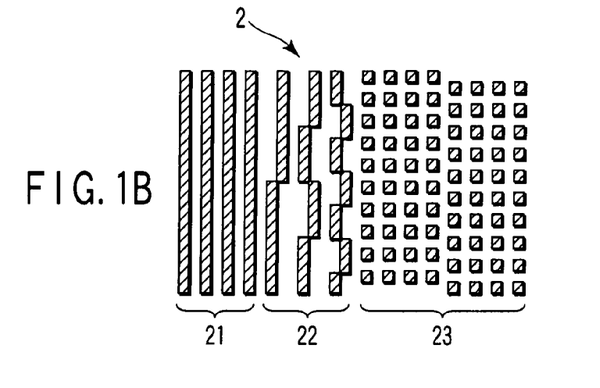
FIG. 1B is an enlarged plan view of a part of a servo area.

FIG. 1B shows an enlarged plan view of a part of the servo area 2. As shown in FIG. 1B, the servo area 2 includes a preamble part 21, an address part 22, and a burst part 23. The areas such as burst marks, hatched in FIG. 1B, are formed of protruded magnetic patterns. A nonmagnetic material is filled in between the protruded magnetic patterns.

Figure 2A:
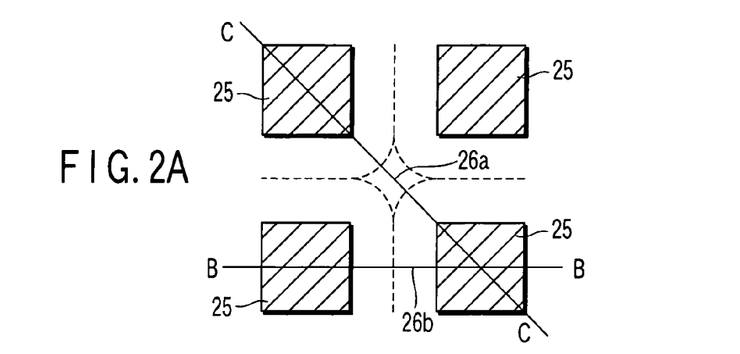
FIG. 2A is an enlarged plan view of a portion at which four burst marks are arranged.
Figure 2B:
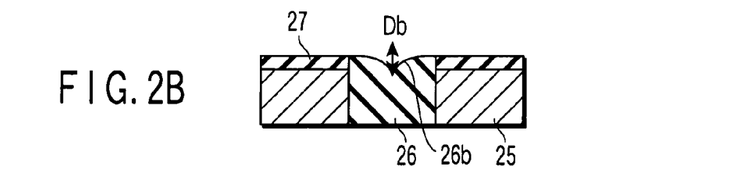
FIG. 2B is a cross-sectional view taken along the line B-B in FIG. 2A.
Figure 2C:
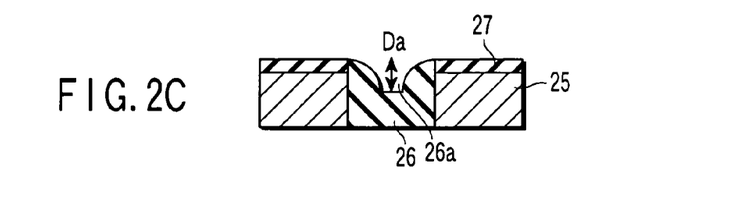
FIG. 2C is a cross-sectional view taken along the line C-C in FIG. 2A.

FIG. 2A, an enlarged plan view, shows a portion at which four burst marks 25 are arranged. FIG. 2B shows a cross-sectional view taken along the line B-B in FIG. 2A, and FIG. 2C shows a cross-sectional view taken along the line C-C in FIG. 2A, respectively. As shown in FIG. 2B, suppose that a depth from the surface of the burst mark 25 to the surface of a nonmagnetic material 26 filled in the first central part 26b between the burst marks 25 adjacent to each other in a cross-track direction or a down-track direction is $D_b$. As shown in FIG. 2C, suppose that a depth from the surface of the burst mark 25 to the surface of the nonmagnetic material 26 filled in the second central part 26a of a portion surrounded by the four burst marks 25 (between the burst marks 25 in a diagonal relationship) is $D_a$. In the embodiment, the depth $D_a$ is greater than the depth $D_b$.

Note that it is not always necessary to measure the depth to the surface of the nonmagnetic material 26 filled in between the burst marks 25 strictly from the surface of the burst mark 25 when a protective layer 27 is formed on the burst marks 25, and it may be measured from the surface of the protective layer 27. In the embodiment, because the aforementioned difference in depth $(D_a-D_b)$ is important, it is not a problem whether a surface used as the reference level for measurement of the depth is the surface of the burst mark 25 or the surface of the protective layer 27.

As shown in FIGS. 2B and 2C, if recesses are formed on the surface of the nonmagnetic material 26 filled in between the burst marks 25, the flying height of the magnetic head can be lowered moderately, leading to a higher SNR of burst signals.

Further, as shown in FIGS. 2B and 2C, when the recesses are formed with different two levels in depth on the surface of the nonmagnetic material 26, it is possible to preserve more lubricant on the surface of the media compared with a conventional media, making it possible to improve head crash resistance. Hereinafter, this effect will be described more in detail.

It is supposed thought that a lubricant applied to the carbon protective layer on the surface of the media includes a bonding layer bonded comparatively strongly with carbon and a free layer which can move comparatively freely on the bonding layer. At the time of a head crash, even if a trace amount of the bonding layer of the lubricant is stripped away and is lost from the surface of the media, there is no problem in the function of the drive as long as the lubricant as the free layer is replenished. However, if frequencies of head crash are increased, the lubricant lost from the surface of the media is increased and the lubricant is exhausted eventually. When the head touches the surface of the media at a portion where the lubricant is exhausted as described above, the media is damaged and the drive fails.

In the patterned media according to the embodiment, because the two-step recesses having different depths are formed on the surface of the nonmagnetic material filled in the burst part, the media has a large surface area and can preserve a great amount of lubricant mainly in deeper recesses shown in FIG. 2C. Therefore, even if the lubricant is lost from the surface of the media at the time of a head crash, the lubricant preserved in the deeper recesses is easily replenished. Accordingly, the patterned media according to the embodiment hardly cause exhaustion of the lubricant even when a head crash is brought about, making the drive more reliable, as compared with a conventional patterned media.

In the embodiment, the difference of the depths $(D_a-D_b)$ is preferably 10 nm or less. When the difference $(D_a-D_b)$ exceeds 10 nm, flying characteristics of the magnetic head over the media is made unstable, which brings about vibration of the magnetic head. In the embodiment, the difference of the depths $(D_a-D_b)$ is preferably 1 nm or more. When the difference $(D_a-D_b)$ is less than 1 nm, it is impossible to preserve so much lubricant on the surface of the media, making it impossible to improve the head crash resistance.

The patterned media according to the embodiment may be any of a discrete track (DTR) media, a discrete bit media, and a nano-patterned media. These patterned media will be described with reference to FIGS. 3, 4, and 5.

Figure 3:
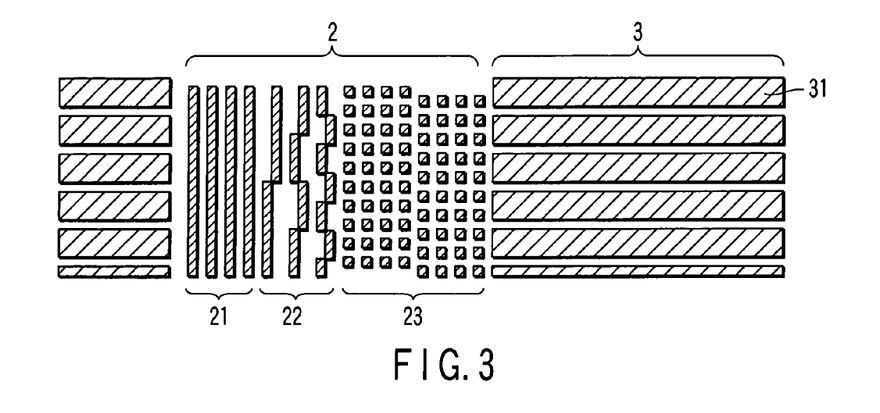
FIG. 3 is a plan view in the circumferential direction of a discrete track media according to the embodiment.

FIG. 3A shows a plan view in the circumferential direction of a discrete track media according to the embodiment. Likewise FIG. 1B, the servo area 2 in FIG. 3 includes the preamble part 21, the address part 22, and the burst part 23. As shown in FIG. 3, discrete tracks 31 are included in the data area 3.

The discrete tracks 31 in the DTR media shown in FIG. 3 have a structure in which a ferromagnetic layer including granular magnetic particles with a physical particle size of about 8 nm extends in the down track direction. When recording is carried out to a discrete track 31, several hundred magnetic particles are included in one recording mark. In this case, recording mark edges have a zigzag structure depending on the magnetic particle size. Therefore, in the DTR media, it is impossible to avoid transition noise in the down-track direction depending on the magnetic particle size. As a patterned media which enables to reduce such transition noise, a discrete bit media has been proposed.

Figure 4:
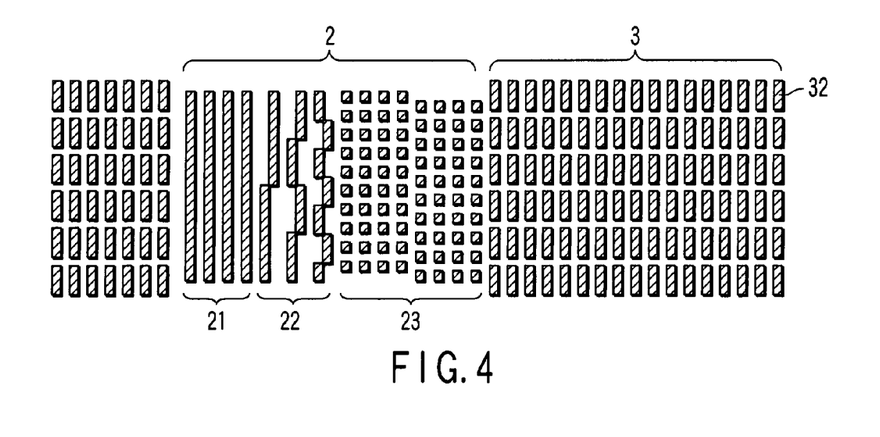
FIG. 4 is a plan view in the circumferential direction of a discrete bit media according to another embodiment.

FIG. 4 shows a plan view in the circumferential direction of a discrete bit media according to another embodiment. In the data area 3 in FIG. 4, the ferromagnetic layer is physically isolated not only in the cross-track direction but also in the down-track direction to form the discrete bits 32. The discrete bit media makes it possible to greatly reduce the transition noise described above.

The discrete bit type patterned media is manufactured by an imprint method using a stamper formed by utilizing electron beam lithography. However, when the size of the discrete bit is made 50 nm or less, electron beam lithography itself is made difficult. Then, in order to form more minute bits, a method utilizing a self-assembling phenomenon is used. For example, it is possible to form micropatterns using a self-assembling method in which patterns are controllably arrayed through phase separation of a diblock copolymer (artificially assisted self-assembling: AASA). The patterned media manufactured by utilizing such a method is called a nano-patterned media.

Figure 5:
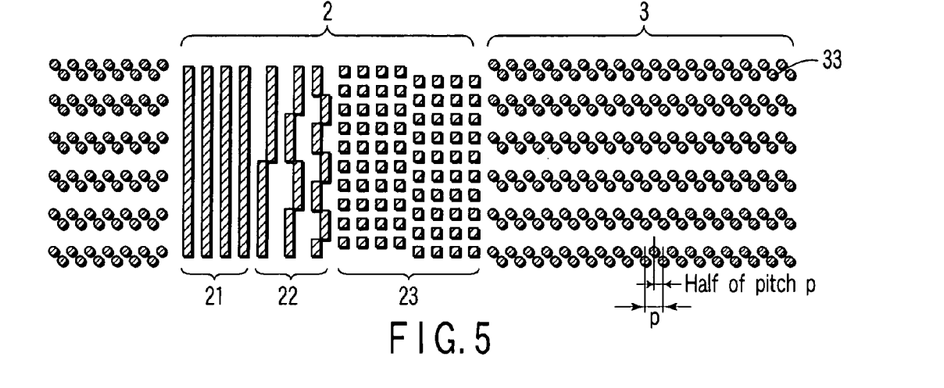
FIG. 5 is a plan view in the circumferential direction of a nano-patterned media according to yet another embodiment.

FIG. 5 shows a plan view in the circumferential direction of a nano-patterned media according to yet another embodiment. The recording tracks formed in the data area 3 of FIG. 5 includes two lines of sub-tacks in which magnetic dots 33 formed of protruded magnetic patterns are arrayed at a pitch P in the down-track direction and in which positions of the magnetic dots 33 on adjacent two sub-tracks are shifted by a half of the pitch P.

Hereinafter, a method of manufacturing a patterned media using imprint lithography according to the embodiment will be described. The patterned media according to the embodiment is manufactured by the method comprising: depositing a magnetic film on a substrate, followed by applying a resist to the magnetic film; pressing a stamper, on which recessed patterns are formed corresponding to the burst marks, to the resist to form protruded resist patterns corresponding to the burst marks; etching the magnetic film using the protruded resist patterns as masks to form protruded burst marks, followed by removing the resist patterns; depositing a nonmagnetic material to be filled in between the magnetic patterns by sputtering without applying a substrate bias; and etching-back the nonmagnetic material.

Here, for comparison, a typical method of manufacturing the conventional patterned media using imprint lithography will be described. In the conventional method, because the burst marks are formed by filling a nonmagnetic material in the recesses provided on a ferromagnetic layer, a stamper having protruded patterns corresponding to the burst marks is used. First, the ferromagnetic layer is deposited on the substrate, and then a resist is applied to the ferromagnetic layer. The patterns of the stamper are transferred to the resist by pressing the stamper having protruded patterns corresponding to the burst marks to the resist to forming resist patterns. The ferromagnetic layer is etched by using the resist patterns as masks, and then a nonmagnetic material is filled in the recesses in the ferromagnetic layer. Thereafter, burst marks formed of the nonmagnetic material are formed by etching back the nonmagnetic material.

The reason why such a method is conventionally used is as follows. As descried above, when the stamper having the protruded patterns corresponding to the burst marks is pressed to the resist, the amount of resist to be eliminated from the area corresponding to the burst marks is little, which makes it possible to favorably carry out the imprint process. In contrast thereto, it has been believed that, when an imprint process is carried out by using a stamper having recessed patterns corresponding to burst marks, which is reversed to the conventional stamper, an amount of resist to be eliminated is great, which makes it impossible to sufficiently eliminate the resist. However, in accordance with study by the present inventors, it has been found that, if a pressure is appropriately set in the imprint process, it is possible to favorably eliminate the resist even if a stamper having recessed patterns corresponding to the burst marks is used.

Figure 6A:
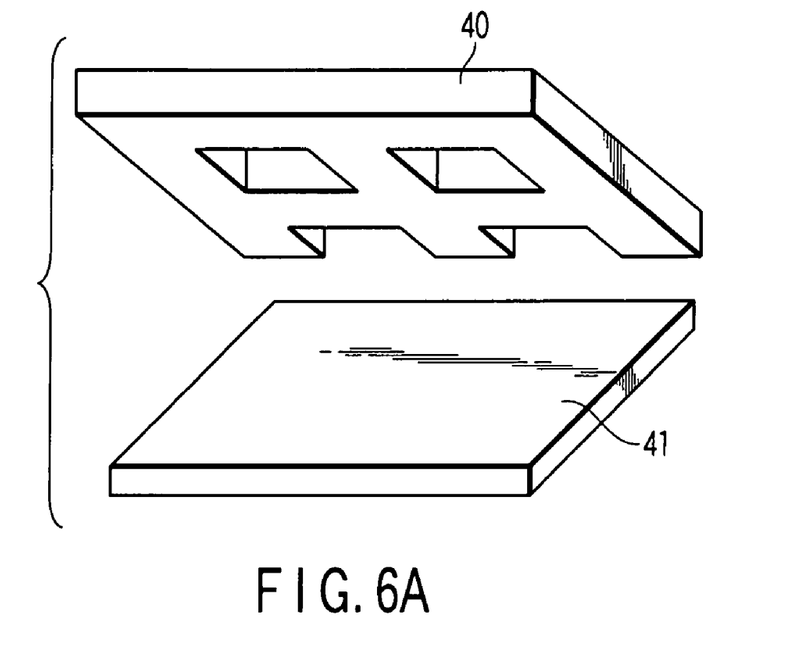
FIG. 6A is a perspective view of a stamper used in the embodiment.
Figure 6B:
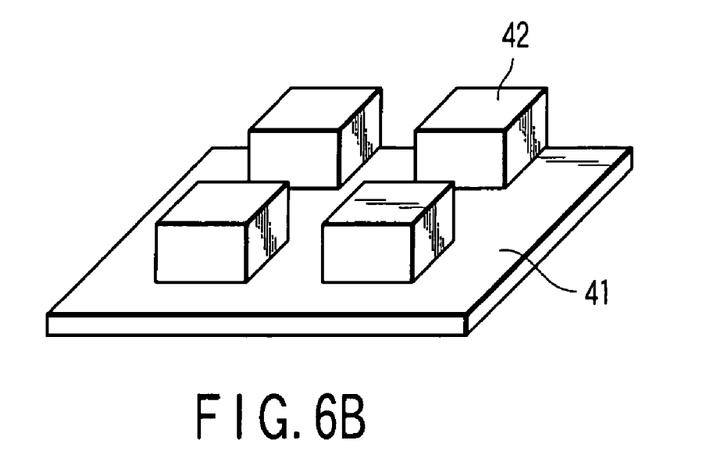
FIG. 6B is a perspective view showing protruded patterns corresponding to the burst marks formed in a resist.

FIG. 6A shows a perspective view of a stamper 40 used in the embodiment. In the stamper 40, recessed patterns are formed so as to correspond to the burst marks. FIG. 6B shows protruded patterns 42 corresponding to the burst marks formed by pressing the stamper 40 of FIG. 6A to a resist 41. As will be described later, the ferromagnetic layer under the protruded patterns 42 of the resist 41 are used as magnetic patterns such as burst marks and discrete tracks (or discrete bits), or the like.

Further, in order to form the recesses with different two levels in depth on the surface of the nonmagnetic material to be filled in between the magnetic patterns, the nonmagnetic material is deposited by sputtering without applying a substrate bias so as to be filled in between the burst marks.

Because use of the method according to the embodiment forms the burst marks in protruded magnetic patterns, the effect of side-etching appears in processing the ferromagnetic layer, which makes it possible to reduce the sizes of the burst marks formed of the protruded magnetic patterns compared with the sizes of the recessed patterns corresponding to the burst marks on the stamper formed by electron beam lithography. When the burst marks formed of magnetic patterns with reduced sizes as described above are detected by the magnetic head, it is possible to clearly distinguish the signals of adjacent burst marks, leading to improved accuracy in head positioning.

A method of manufacturing a discrete track media (or a discrete bit media) according to an embodiment will be described specifically with reference to FIGS. 7A to 7H.

Figure 7A:
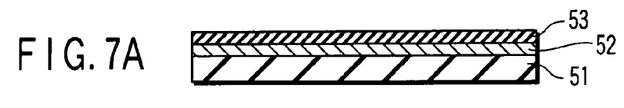
FIGS. 7A, 7B, 7C, 7D, 7E, 7F, 7G, and 7H are cross-sectional views showing a method of manufacturing a discrete track media (or a discrete bit media) according to an embodiment.

A soft underlayer formed of 120 nm-thick CoZrNb, an orientation control layer formed of 20 nm-thick Ru, a ferromagnetic layer 52 formed of 20 nm-thick CoCrPt—$SiO_2$, and a protective layer 53 formed of 4 nm-thick carbon (C) are sequentially deposited on a glass substrate 51. Here, for simplicity, the soft underlayer and the orientation control layer are not depicted (FIG. 7A).

Figure 7B:
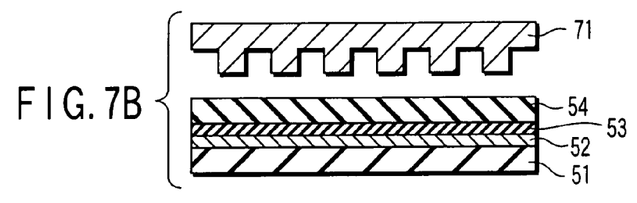
Figure 7C:
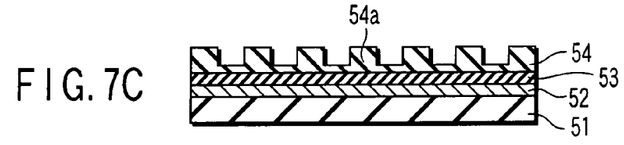

The protective layer 53 is spin-coated with 100 nm-thick spin-on-glass (SOG) as a resist 54. A stamper 71 is disposed so as to face the resist 54 (FIG. 7B). As shown in FIG. 6A, recessed patterns are formed on the stamper 71 corresponding to the burst marks. Imprinting is carried out by using the stamper 71, and protruded patterns 54a of the resist 54 are formed corresponding to the protruded patterns of the stamper 71 (FIG. 7C). As will be described later, the ferromagnetic layer 52 under the protruded patterns 54a of the resist 54 are used as magnetic patterns such as burst marks and discrete tracks (or discrete bits), and the like.

Figure 7D:
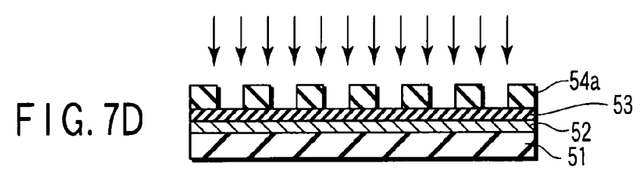

Etching is carried out with an inductively-coupled plasma (ICP) etching apparatus to remove resist residues remaining on the bottoms of the recesses of the patterned resist 54. The conditions in this process, for example, are as follows: $CF_4$ is used as a process gas, the chamber pressure is set to 2 mTorr, the RF powers for the coil and the platen are respectively set to 100 W, and the etching time is set to 30 seconds (FIG. 7D).

Figure 7E:
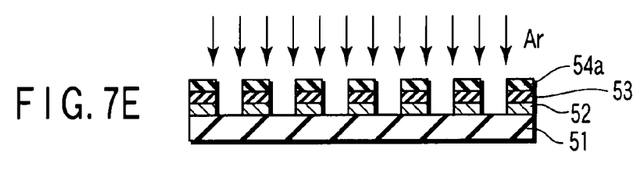

Ion milling is carried out with an electron cyclotron resonance (ECR) ion gun using the remaining resist patterns (SOG) as etching-resistive masks, the 20 nm-thick ferromagnetic layer 52 is etched (FIG. 7E). The conditions in this process, for example, are as follows: Ar is used as a process gas, the microwave power is set to 800 W, the accelerating voltage is set to 500V, and the etching time is set to 3 minutes. The protruded magnetic patterns formed by the etching are used as burst marks, discrete tracks (or discrete bits), and the like. Because the peripheries of the protruded magnetic patterns are side-etched in this process, it is possible to form burst marks smaller than the design values of the recesses of the stamper processed by electron beam lithography. Thereafter, the resist (SOG) is stripped with an RIE apparatus. The conditions in this process, for example, are as follows: $CF_4$ gas is used as the process gas, the chamber pressure is set to 100 mTorr, and the power is set to 100 W.

Figure 7F:
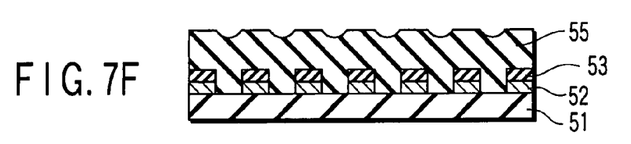

Sputtering is carried out with a sputtering apparatus for HDD to deposit 100 nm-thick carbon (C) as a nonmagnetic material 55 to be filled in the recesses between the magnetic patterns (FIG. 7F). The conditions in this process, for example, are as follows: the chamber pressure is set to 0.67 Pa, the power is set to 500 W, and no substrate bias is applied. The chamber pressure is preferably 1 Pa or less, and is more preferably 0.5 to 0.3 Pa. Filling the nonmagnetic material 55 in the recesses between the magnetic patterns without applying the substrate bias as described above makes it possible to form recesses with different two levels in depth depending on positions on the surface of the nonmagnetic material 55. In contrast, when bias sputtering is carried out while applying a bias to the substrate, since the flatness of the nonmagnetic material is improved, it makes impossible to form the desired surface structure.

Figure 7G:
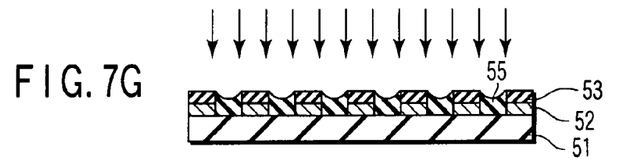

Ion milling is carried out with the ECR ion gun to etch back the nonmagnetic material 55 (FIG. 7G). The conditions in this process, for example, are as follows: Ar is used as the process gas, the microwave power is set to 800 W, the accelerating voltage is set to 700V, and the etching time is set to 5 minutes. Note that, a quadrupole mass spectrometer (Q-MASS) may be used to estimate the end point of etch-back based on the time when Co included in the ferromagnetic layer is detected. As a result, it is possible to form the surface structure in which the depths $D_a$ and $D_b$, which are from the surface of the burst mark to the surface of the nonmagnetic material 55, are made in two levels depending on positions, as shown in FIGS. 2B and 2C.

Figure 7H:
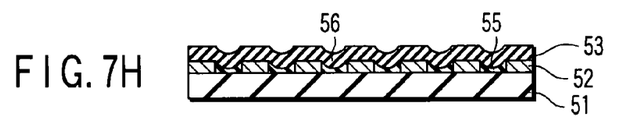

A protective layer 56 is formed by depositing carbon (C) again by chemical vapor deposition (FIG. 7H). Further, a lubricant is applying to the protective layer 56 to manufacture a patterned media (a discrete track media or a discrete bit media).

Next, a method of manufacturing a nano-patterned media according to another embodiment will be described specifically with reference to FIGS. 8A to 8H. Note that methods for forming the data areas (recording tracks) are different between the method of manufacturing a discrete track media (or a discrete bit media) and the method of manufacturing a nano-patterned media, and thus the data areas are shown in FIGS. 8A to 8H.

Figure 8A:
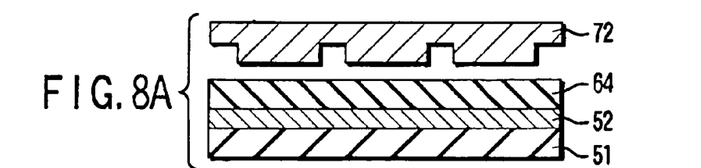
FIGS. 8A, 8B, 8C, 8D, 8E, 8F, 8G, and 8H are cross-sectional views showing a method of manufacturing a nano-patterned media according to another embodiment.
Figure 8B:
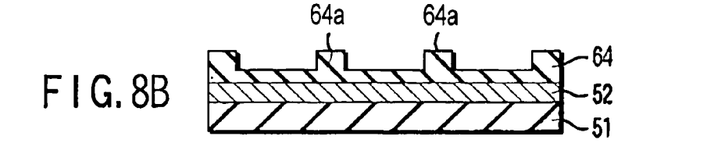
Figure 8C:
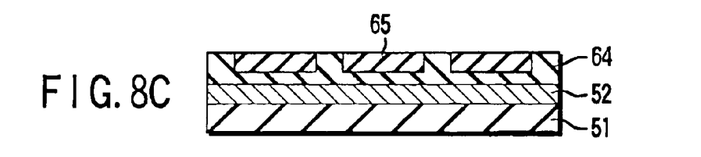

A soft underlayer formed of 120 nm-thick CoZrNb, an orientation control layer formed of 20 nm-thick Ru, and a ferromagnetic layer 52 formed of 20 nm-thick CoCrPt—SiO$_2$ are sequentially deposited on a glass substrate 51. Here, for simplicity, the soft underlayer and the orientation control layer are not depicted (FIG. 8A). The ferromagnetic layer 52 is spin-coated with a 100 nm-thick novolak-based photoresist S1801 (Shipley Corporation) as a resist 64. A stamper 72 is disposed so as to face the resist 64 (FIG. 8A). Recessed patterns are formed on the stamper 72 corresponding to the burst marks. Imprinting is carried out by using the stamper 72, and protruded patterns 64a of the resist 64 are formed correspondingly to the protruded patterns of the stamper 72 (FIG. 8C). The resist 64 on which the protruded patterns 64a are formed by imprinting is cured by ultraviolet irradiation and baking at 160° C.

In the data areas shown in FIG. 8, as will be described below, recording tracks are formed in which nano-patterns are arrayed in the recesses between the protruded patterns 64a of the resist 64.

Figure 8D:
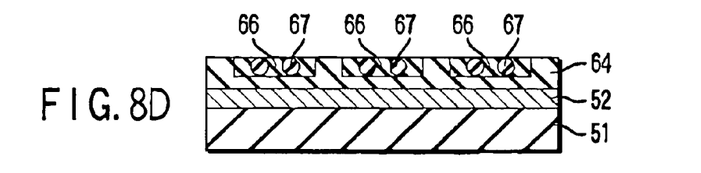

The resist 64 is spin-coated with a solution of polystyrene-polymethyl methacrylate (PS-PMMA) diblock copolymer in an organic solvent to form a self-assembling film 65 (FIG. 8C). The self-assembling film 65 is phase-separated by annealing at about 140 to 200° C., thereby forming a sea-island structure in which PMMA particles 67 of 40 nm in diameter are arrayed in a triangular lattice at a pitch of about 80 nm in a PS phase 66 (FIG. 8D). As compared with a normal pattern forming method, for example, EB lithography, photolithography, X-ray lithography, near-field lithography, interference exposure, a focused ion beam (FIB), or the like, the method of forming nano-patterns using the self-assembling phenomenon is advantageous in that it is possible to form nano-patterns in a large area at low costs and for a short time.

Figure 8E:
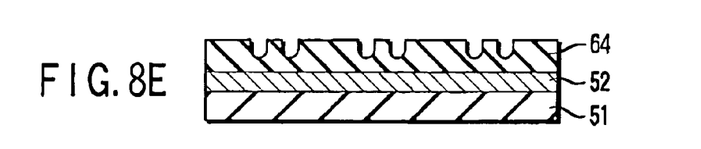
Figure 8F:
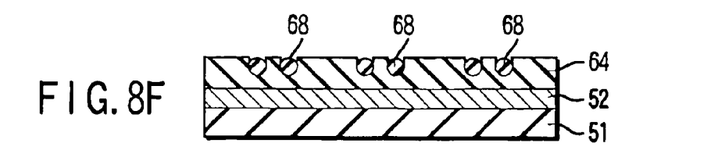
Figure 8G:
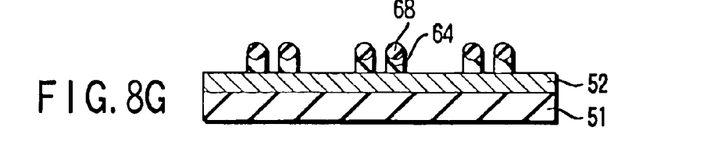
Figure 8H:
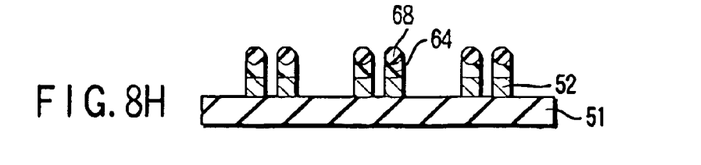

Oxygen plasma processing is carried out to selectively remove only the PMMA particles 67 so as to form holes (FIG. 8E). SOG 68 is filled in the holes where the PMMA particles have been removed (FIG. 8F). Oxygen plasma processing is carried out with an ICP etching apparatus to remove the PS phases 66 and the resist 64 except for the portions covered with the SOG 68 (FIG. 8G). The 20 nm-thick ferromagnetic layer 52 is etched by ion milling using the remaining SOG 68 as an etching-resistive mask (FIG. 8H). The SOG 68 is stripped with an RIE apparatus.

Because the processes after the above process are carried out in the same way as in FIGS. 7F to 7H, the illustrations thereof are omitted from FIG. 8, and brief descriptions thereof will be given with reference to FIGS. 7F to 7H. Sputtering is carried out with a sputtering apparatus for HDD to deposit 100 nm-thick carbon (C) as a nonmagnetic material 55 to be filled in the recesses between the magnetic patterns (FIG. 7F). Ion milling is carried out with the ECR ion gun to etch back the nonmagnetic material 55 (FIG. 7G). A protective layer 56 is formed by depositing carbon (C) again by chemical vapor deposition (FIG. 7H). Further, a lubricant is applying to the protective layer 56 to manufacture a patterned media (a nano-patterned media).

Next, the materials used in the embodiments of the present invention will be described.

<Substrate>

The substrate may be, for example, a glass substrate, an Al alloy substrate, a ceramic substrate, a carbon substrate, a Si single-crystal substrate having an oxide on the surface thereof. The glass substrate may be formed of amorphous glass or crystallized glass. The amorphous glass includes generally used soda lime glass and aluminosilicate glass. The crystallized glass includes lithium-based crystallized glass. The ceramic substrate includes a sintered body mainly formed of generally used aluminum oxide, aluminum nitride or silicon nitride, or a material obtained by fiber-reinforcing the sintered body. The substrate may be one in which a NiP layer is formed on the surface of the metal substrate or non-metal substrate described above by plating or sputtering.

It should be noted that the following describes only sputtering as a method of depositing a thin film on the substrate. However, the similar effects to the sputtering can be provided when vacuum deposition or electroplating is used.

<Soft Underlayer>

The soft underlayer (SUL) is provided so as to pass a recording field from a magnetic head such as a single-pole head to magnetize the perpendicular recording layer therein and to return the recording field to a return yoke arranged near the recording magnetic pole. That is, the soft underlayer provides a part of the function of the write head, serving to apply a steep perpendicular magnetic field to the recording layer so as to improve recording and reproduction efficiency.

The soft underlayer may be made of a material containing at least one of Fe, Ni, and Co. Such materials include an FeCo alloy such as FeCo and FeCoV, an FeNi alloy such as FeNi, FeNiMo, FeNiCr and FeNiSi, an FeAl alloy and FeSi alloy such as FeAl, FeAlSi, FeAlSiCr, FeAlSiTiRu and FeAlO, an FeTa alloy such as FeTa, FeTaC and FeTaN, and an FeZr alloy such as FeZrN.

The soft underlayer may be made of a material having a microcrystalline structure or a granular structure containing fine grains dispersed in a matrix such as FeAlO, FeMgO, FeTaN and FeZrN, each containing 60 at % or more of Fe.

The soft underlayer may be made of other materials such as a Co alloy containing Co and at least one of Zr, Hf, Nb, Ta, Ti and Y. The material preferably contains 80 at % or more of Co. An amorphous layer can be easily formed when the Co alloy is deposited by sputtering. The amorphous soft magnetic material exhibits very excellent soft magnetism because of free from magnetocrystalline anisotropy, crystal defects and grain boundaries. The use of the amorphous soft magnetic material may reduce media noise. Preferred amorphous soft magnetic materials include, for example, a CoZr-, CoZrNb- and CoZrTa-based alloys.

Another underlayer may be provided under the soft underlayer in order to improve the soft underlayer in the crystallinity or in the adhesion to the substrate. Materials for the underlayer include Ti, Ta, W, Cr, Pt, and an alloy thereof, and oxide and nitride containing the above metal. An intermediate layer may be provided between the soft underlayer and the recording layer. The intermediate layer serves to cut off exchange coupling interaction between the soft underlayer and the recording layer and to control the crystallinity of the recording layer. Materials for the intermediate layer include Ru, Pt, Pd, W, Ti, Ta, Cr, Si and an alloy thereof, and oxide and nitride containing the above metal.

To prevent spike noise, the soft underlayer may be divided into layers antiferromagnetically coupled with each other through a Ru layer with a thickness of 0.5 to 1.5 nm sandwiched therebetween. Alternatively, the soft underlayer may be exchange-coupled with a pinning layer made of a hard magnetic layer with in-plane anisotropy such as CoCrPt, SmCo and FePt or an antiferromagnetic layer such as IrMn and PtMn. In this case, to control the exchange coupling force, a magnetic layer such as Co or a nonmagnetic layer such as Pt may be provided on and under the Ru layer.

<Magnetic Recording Layer>

The perpendicular recording layer is preferably made of a material mainly containing Co, containing at least Pt, and further containing an oxide. The perpendicular magnetic recording layer may include Cr as desired. Particularly suitable oxide is silicon oxide and titanium oxide. The perpendicular recording layer preferably has a structure in which magnetic grains, i.e., crystalline grains with magnetism are dispersed in the layer. The magnetic grains preferably have a columnar configuration penetrating the perpendicular recording layer. Such a structure improves orientation and crystallinity of the magnetic grains in the perpendicular recording layer, making it possible to provide a signal-to-noise ratio (SNR) suitable for high-density recording. The amount of oxide is important for obtaining the above structure.

The oxide content to the total amount of Co, Pt and Cr is preferably 3 mol % or more and 12 mol % or less, more preferably 5 mol % or more and 10 mol % or less. If the oxide content of the perpendicular recording layer is within the above range, the oxide is precipitated around the magnetic grains, making it possible to isolate the magnetic grains and to reduce their sizes. If the oxide content exceeds the above range, the oxide remains in the magnetic grains to degrade the orientation and crystallinity. Moreover, the oxide is precipitated over and under the magnetic grains to prevent formation of the columnar structure penetrating the perpendicular recording layer. On the other hand, if the oxide content is less than the above range, the isolation of the magnetic grains and the reduction in their sizes are insufficient. This increases media noise in reproduction and makes it impossible to obtain a SNR suitable for high-density recording.

The Cr content of the perpendicular recording layer is preferably 0 at % or more and 16 at % or less, more preferably 10 at % or more and 14 at % or less. When the Cr content is within the above range, high magnetization can be maintained without unduly reduction in the uniaxial magnetic anisotropy constant Ku of the magnetic grains. This brings read/write characteristics suitable for high-density recording and sufficient thermal fluctuation characteristics. If the Cr content exceeds the above range, Ku of the magnetic grains decreases to degrade the thermal fluctuation characteristics as well as to degrade the crystallinity and orientation of the magnetic grains. As a result, the read/write characteristics may be degraded.

The Pt content of the perpendicular recording layer is preferably 10 at % or more and 25 at % or less. When the Pt content is within the above range, the perpendicular recording layer provides a required uniaxial magnetic anisotropy constant Ku. Moreover, the magnetic grains exhibit good crystallinity and orientation, resulting in thermal fluctuation characteristics and read/write characteristics suitable for high-density recording. If the Pt content exceeds the above range, a layer of an fcc structure may be formed in the magnetic grains to degrade the crystallinity and orientation. On the other hand, if the Pt content is less than the above range, it is impossible to obtain Ku to provide thermal fluctuation characteristics suitable for high-density recording.

The perpendicular recording layer may contain not only Co, Pt, Cr and an oxide but also one or more additive elements selected from the group consisting of B, Ta, Mo, Cu, Nd, W, Nb, Sm, Tb, Ru and Re. These additive elements enable to facilitate reduction in the sizes of the magnetic grains or to improve the crystallinity and orientation. This in turn makes it possible to provide read/write characteristics and thermal fluctuation characteristics more suitable for high-density recording. These additive elements may preferably be contained totally in 8 at % or less. If the total content exceeds 8 at %, a phase other than the hcp phase is formed in the magnetic grains. This degrades crystallinity and orientation of the magnetic grains, making it impossible to provide read/write characteristics and thermal fluctuation characteristics suitable for high-density recording.

Other materials for the perpendicular recording layer include a CoPt alloy, a CoCr alloy, a CoPtCr alloy, CoPtO, CoPtCrO, CoPtSi and CoPtCrSi. The perpendicular recording layer may be formed of a multilayer film containing a Co film and a film of an alloy mainly including an element selected from the group consisting of Pt, Pd, Rh and Ru. The perpendicular recording layer may be formed of a multilayer film such as CoCr/PtCr, CoB/PdB and CoO/RhO, which are prepared by adding Cr, B or O to each layer of the above multilayer film.

The thickness of the perpendicular recording layer preferably ranges between 5 nm and 60 nm, more preferably between 10 nm and 40 nm. The perpendicular recording layer having a thickness within the above range is suitable for high-density recording. If the thickness of the perpendicular recording layer is less than 5 nm, read output tends to be so low that a noise component becomes relatively high. On the other hand, if the thickness of the perpendicular recording layer exceeds 40 nm, read output tends to be so high as to distort waveforms. The coercivity of the perpendicular recording layer is preferably 237,000 A/m (3,000 Oe) or more. If the coercivity is less than 237,000 A/m (3,000 Oe), the thermal fluctuation tolerance may be degraded. The perpendicular squareness of the perpendicular recording layer is preferably 0.8 or more. If the perpendicular squareness is less than 0.8, the thermal fluctuation tolerance tends to be degraded.

<Protective Layer>

The protective layer serves to prevent corrosion of the perpendicular recording layer and to prevent damage to the media surface when the magnetic head comes into contact with the media. Materials for the protective layer include, for example, C, $SiO_2$ and $ZrO_2$. The protective layer preferably has a thickness of 1 to 10 nm. When the thickness of the protective layer is within the above range, the distance between the head and the media can be reduced, which is suitable for high-density recording. Carbon can be classified into $sp^2$-bonded carbon (graphite) and $sp^3$-bonded carbon (diamond). The $sp^3$-bonded carbon is more excellent in durability and anticorrosion but is inferior in surface smoothness to graphite. Normally, carbon is deposited by sputtering using a graphite target. This method forms amorphous carbon in which the $sp^2$-bonded carbon (graphite) and $sp^3$-bonded carbon are mixed. The amorphous carbon containing the $sp^3$-bonded carbon in a high ratio is referred to as diamond-like carbon (DLC). The DLC exhibits excellent durability and anticorrosion and also is excellent in the surface smoothness because it is amorphous. In chemical vapor deposition (CVD), DLC is generated through excitation and decomposition of raw material gases in plasma and reaction of the decomposed species, so that DLC further rich in the $sp^3$-bonded carbon can be produced.

Next, preferred manufacturing conditions used in the embodiment will be described.

<Imprinting>

A resist is applied to the surface of the substrate by spin-coating, and a stamper is pressed against it, thereby transferring the patterns of the stamper onto the resist. The resist includes, for example, a general novolak-based photoresist, or spin-on-glass (SOG). The surface of the stamper on which patterns of protrusions and recesses corresponding to servo information and recording tracks are formed are made to face the resist on the substrate. At this time, the stamper, the substrate, and the buffer layer are laminated on a lower plate of a die set, and those are sandwiched with an upper plate of the die set, and pressed, for example, at 2000 bar for 60 seconds. The heights of the patterns of protrusions formed in the resist by imprinting are, for example, 60 to 70 nm. The resist to be eliminated is moved by holding it for about 60 seconds in this state. Applying a fluorine-containing releasing agent on the stamper enables to favorably release the stamper from the resist.

<Residue Removal>

Residues remaining on the bottoms of the recesses of the resist are removed by reactive ion etching (RIE). In this process, an appropriate process gas is used depending on the resist material. As a plasma source, inductively-coupled plasma (ICP) which can generate high-density plasma at low pressure is suitable. However, electron cyclotron resonance (ECR) plasma, or a general parallel plate type RIE apparatus may be used.

<Etching of Ferromagnetic Layer>

After the residues are removed, the ferromagnetic layer is processed by using the resist patterns as etching masks. Etching using an Ar ion beam (Ar ion milling) is suitable for processing the ferromagnetic layer. However, RIE using a Cl gas or a mixed gas of CO and $NH_3$ may be used. In the case of the RIE using a mixed gas of CO and $NH_3$, hard masks of Ti, Ta, W, or the like are used as etching masks. In the case of using the RIE, the side walls of the protruded magnetic patterns are hardly tapered. In the case where the ferromagnetic layer is processed by Ar ion milling by which it is possible to etch any material, for example, when the etching is carried out at an accelerating voltage set to 400V while an ion incident angle is being changed from 30° to 70°, the side walls of the protruded magnetic patterns are hardly tapered. In milling with an ECR ion gun, when the etching is carried out in a static type (at an ion incident angle of 90°), the side walls of the protruded magnetic patterns are hardly tapered.

In the embodiments, because the burst marks are formed of protruded magnetic patterns, when side etching is brought about, the dimensions of the burst marks are reduced. In this case, an effect can be obtained in which patterns smaller than those formed on the stamper by electron beam lithography can be formed. Accordingly, the ferromagnetic layer may be etched under the conditions that side etching is brought about to some extent.

<Resist Stripping>

After the ferromagnetic layer is etched, the resist is stripped. When a general photoresist is used, the resist can be easily stripped by carrying out oxygen plasma processing. Concretely, the photoresist is stripped using an oxygen ashing apparatus, for example, under the following conditions: the chamber pressure is set to 1 Torr, the power is set to 400 W, and the processing time is set to 5 minutes. When SOG is used as the resist, SOG is stripped by RIE using a fluorine gas. As a fluorine gas, $CF_4$ or $SF_6$ is suitable. Note that, because there are possibilities that a fluorine gas reacts with water in atmosphere to produce acid such as HF, $H_2SO_4$, or the like, it is preferable to carry out rinsing.

<Filling Nonmagnetic Material in Recesses>

After the resist is stripped, a nonmagnetic material is filled in recesses. A nonmagnetic material can be selected from oxides such as $SiO_2$, $TiO_x$, and $Al_2O_3$, nitrides such as $Si_3N_4$, AlN, and TiN, carbides such as TiC, borides such as BN, simple materials such as C, and Si. In this process, when sputtering is carried out without applying a substrate bias, recesses are formed with different two levels in depth depending on positions on the surface of the nonmagnetic material. The chamber pressure is preferably 1 Pa or less, and is more preferably from 0.5 to 0.3 Pa. For example, a desired surface structure is formed by sputtering without applying a substrate bias to fill carbon to the recesses, under the chamber pressure set to 0.67 Pa while applying the DC power of 500 W to a carbon target.

<Etching-back of Non-magnetic Material>

The etching-back is carried out until the carbon protective layer on the ferromagnetic film is exposed. This etching-back process can be carried out by using, for example, Ar ion milling. When a silicon-based nonmagnetic material such as $SiO_2$ is used, the etching-back may be carried out by RIE using a fluorine-based gas. Further, the etching-back of the nonmagnetic material may be carried out by using an ECR ion gun.

<Protective Layer Formation and Post-processing>

After the etching-back, a carbon protective layer is formed. The carbon protective layer can be deposited by CVD, sputtering, or vacuum evaporation. By the CVD, a DLC film including a large amount of $sp^3$-bonded carbon is formed. A lubricant is applied to the protective layer. As a lubricant, for example, perfluoro polyether, fluorinated alcohol, or fluorinated carboxylic acid can be used.

<Self-assembling Material>

When a nano-patterned media is manufactured, a self-assembling material formed of, for example, a diblock copolymer is used as described with reference to the processes of FIGS. 8C and 8D.

The block copolymer is a copolymer in which a polymer chain having a repeating unit A and a polymer chain having a repeating unit B are bonded so as to form in blocks such as -(AA . . . AA)-(BB . . . BB)-. When a block copolymer is heat-treated, the block copolymer has a structure in which an A phase formed of condensed A polymers and a B phase formed of condensed B polymers are phase-separated. As a configuration of the phase-separated structure, for example, there are a "lamellar" structure in which A phases and B phases appear alternately and regularly, a "cylinder" structure in which phases of one type are formed in cylinders, and a "sea-island" structure in which phases of one type are distributed in a spherical shape, and the like. In order to form an appropriate micro-phase separated structure using a block copolymer, it is necessary to appropriately adjust volume fractions of the two polymer phases. The A polymer and B polymer can be used arbitrary. However, it is preferred to select a combination in which the difference in the dry etching rates is great. Concretely, a combination of an aromatic polymer having a relatively high resistance to etching (for example, polystyrene PS, polyvinyl naphthalene, poly-α-methylstyrene, polyvinylpyridine, or the like) and an acrylic polymer with a high dry etching rate (for example, polymethyl methacrylate PMMA, poly-t-butyl methacrylate, or the like) is preferable. In the case of the diblock copolymer of PS-PMMA, it is possible to selectively remove only the PMMA phases utilizing the difference in dry etching resistances thereof. On the other hand, a diblock copolymer of PS-polyvinylpyridine is phase-separated so as to form a definite sea-island structure. However, because there is almost no difference in the dry etching resistances thereof, it is difficult to use it as an etching mask.

The diameters and pitches of dots in the micro-phase separated structure formed in the sea-island structure can be controlled by molecular weights of the A polymer and B polymer. For example, in the case of a PS-PMMA diblock copolymer, given that the molecular weight of PS is 172000, and the molecular weight of PMMA is 41500, the diameter of a PMMA dot can be made 40 nm, and the pitch can be made 80 nm. When the molecular weights of the two polymers are reduced, the structure is also made smaller. For example, given that the molecular weight of PS is 43000, and the molecular weight of PMMA is 10000, the diameter of a PMMA dot can be made 10 nm, and a pitch can be made 29 nm.

Figure 9:
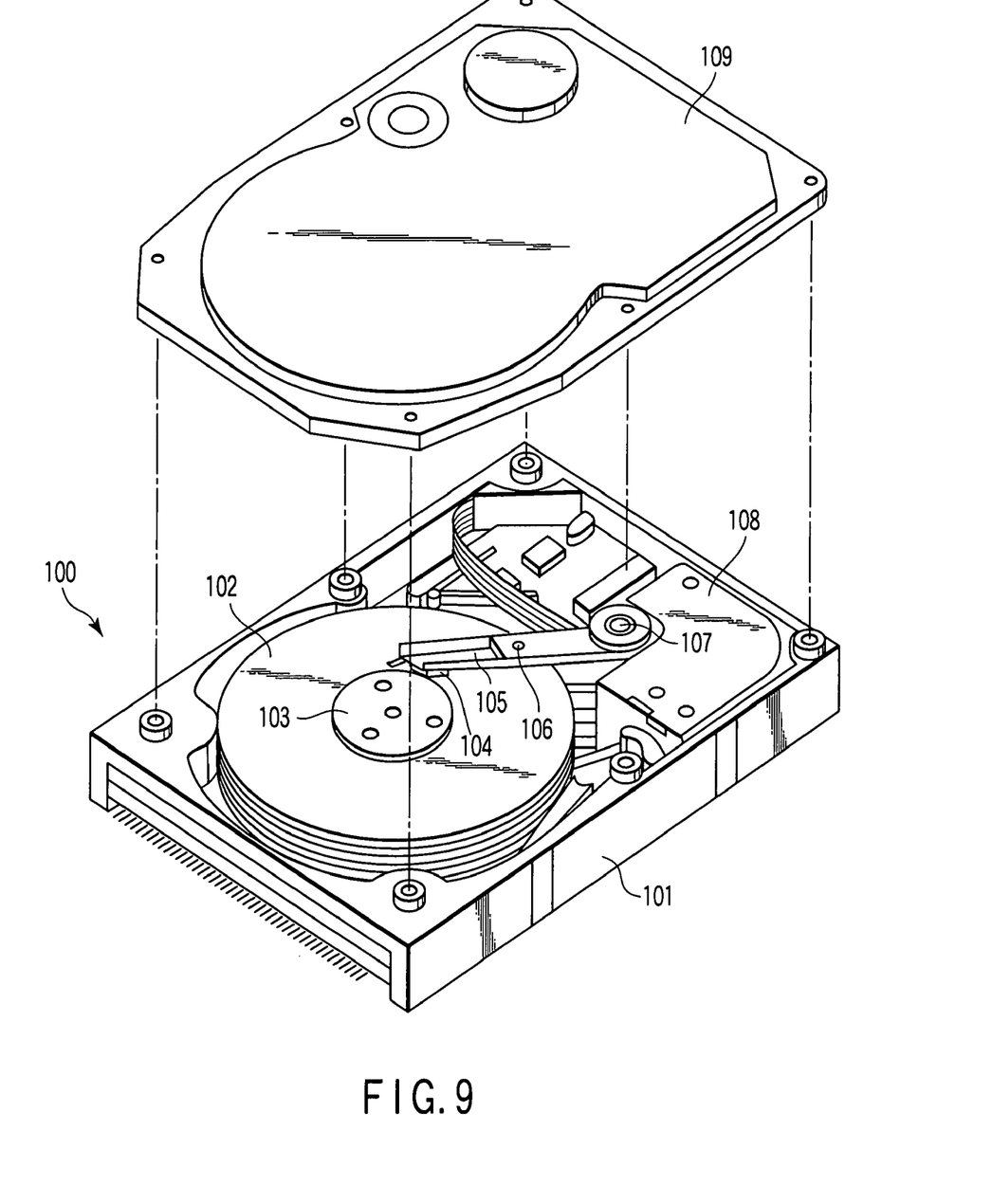
FIG. 9 is a perspective view of a magnetic recording apparatus according to another embodiment.

Next, a magnetic recording apparatus according to the embodiment will be described. FIG. 9 shows a perspective view of a magnetic recording apparatus (a hard disk drive HDD) according to the embodiment. The magnetic disk apparatus 100 comprises a magnetic disk 102, a slider 104 in which a magnetic head is fabricated, a head suspension assembly (an actuator arm 106 and a suspension 105), a voice coil motor (VCM) 108, and a circuit board (not shown), all these components being provided inside a chassis 101. The chassis 101 is covered with a cover 109.

The magnetic disk 102 is a patterned media according to the embodiment. The magnetic disk 102 is mounted to a spindle motor 103 to be rotated, and various digital data are recorded thereon by a perpendicular magnetic recording system. The actuator arm 106 is attached to a pivot 107. The suspension 105 is attached to the tip of the actuator arm 106. The slider 104 is supported on the lower surface of the suspension 105, and the magnetic head built in the slider 104 is made to face the recording surface of the magnetic disk 102. The magnetic head is a so-called combined type, and includes a write head with a single-pole structure and a read head in which a GMR film, a TMR film or the like is provided between the shields. The magnetic head is positioned over an arbitrary radial position of the magnetic disk 102 by driving the actuator arm 106 with the VCM 108. A circuit board (not shown) has a head IC, and generates driving signals for the VCM 108 and control signals for controlling read/write operations with the magnetic head.

The magnetic recording apparatus on which a patterned media is mounted has had problems that it easily brings about a head crash, leading to short service life. The magnetic recording apparatus according to the embodiment exhibits good head crash resistance because it has a good wetting property of the lubricant on the surface of the patterned media mounted thereto.

EXAMPLES

Example 1

A stamper in which only the marks of preamble, address, and burst in the servo areas are formed of recessed patterns by electron beam lithography was prepared. Using the stamper, a patterned media was manufactured by the method shown in FIGS. 7A to 7H. In this patterned media, protruded magnetic patterns are formed in the servo areas, and there are no patterns in the data areas. The burst mark in the manufactured patterned media had a size of 180 nm in one side.

The depths of recesses on the surface of the patterned media were measured with an atomic force microscope (AFM). The depth $D_a$ from the surface of the burst mark to the surface of the nonmagnetic material filled in the second central part 26a at the portion surrounded by the four burst marks shown in FIG. 2C was 10 nm. The depth $D_b$ from the surface of the burst mark to the surface of the nonmagnetic material filled in the first central part 26b between the burst marks adjacent to each other in the cross-track direction or the down-track direction shown in FIG. 2B was 5 nm.

A hard disk drive (HDD) to which the patterned media had been mounted was manufactured, and head output signals were measured with an oscilloscope. As a result, the amplitude of the burst signals was 60 mA. After a heat-run test was carried out at 100° C. over a period of a week, the head output signals were measured again with the oscilloscope. As a result, amplitude of the burst signals was 60 mA, and no change was observed. In this way, it was found that there was no degradation in the burst signals even after the heat-run test. Further, there was no damage in the drive.

Comparative Example 1

The same stamper as in Example 1 was used, but the process of filling the nonmagnetic material in between the magnetic patterns (FIG. 7F) was changed to bias sputtering. The conventional patterned media was manufactured in the same way as in Example 1 except the above change.

When the depths of recesses on the surface of the patterned media were measured with the AFM, it was found that both $D_a$ and $D_b$ were zero and the surface was flat.

A hard disk drive (HDD) to which the patterned media had been mounted was manufactured, and head output signals were measured with an oscilloscope. As a result, the amplitude of the burst signals was 40 mA. When a heat-run test was carried out at 100° C., the drive was damaged in four days.

Since the patterned media in Example 1 has appropriate protrusions and recesses on the surface thereof, the flying height of the magnetic head is made lower than that of the patterned media having a flat surface in Comparative Example 1. Therefore, the patterned media in Example 1 exhibited burst signals with amplitude greater than that of the patterned media in Comparative Example 1. Further, in the drive using the patterned media in Example 1 in which the recesses in the burst part are formed with different two levels in depth, when a contact between the head and the media is brought about, a lubricant preserved in the deeper recesses on the burst part is replenished over a long period or time. Therefore, the drive is hardly damaged and has high reliability. In contrast, in the drive using the patterned media whose surface is flat in Comparative Example 1, when a head crash is brought about, replenishing of the lubricant is not carried out smoothly. Further, because the lubricant is exhausted from the surface of the media in a short time, the drive is easily damaged and has low reliability.

Example 2

A stamper in which the marks of preamble, address, and burst in the servo areas, and recording tracks are formed of recessed patterns by electron beam lithography was prepared. Using the stamper, a patterned media was manufactured by the method shown in FIGS. 7A to 7H. The burst mark in the manufactured patterned media had a size of 180 nm in one side, and the track had a width of 150 nm.

When the depths of recesses on the surface of the patterned media were measured with the AFM, it was found that $D_a$ was 10 nm and $D_b$ was 5 nm. The cross-section of the recording track part was the same as FIG. 2B, and the depth from the surface of the recording track to the surface of the nonmagnetic material filled in the first central part between the recording tracks was 5 nm which is the same as the depth $D_b$.

A hard disk drive (HDD) to which the patterned media had been mounted was manufactured, and head output signals were measured with the oscilloscope. As a result, the amplitude of the burst signals was 60 mA. After a heat-run test was carried out at 100° C. over a period of a week, the head output signals were measured again with the oscilloscope. As a result, amplitude of the burst signals was 60 mA, and no change was observed. In this way, it was found that there was no degradation in the burst signals even after the heat-run test. Further, there was no damage in the drive.

Comparative Example 2

A stamper in which only the recording tracks were formed of recessed patterns was prepared by electron beam lithography. Using the stamper, a patterned media was manufactured by the same method as in Example 2.

The cross-section of the recording track part was the same as FIG. 2B, and the depth from the surface of the recording track to the surface of the nonmagnetic material filled in the central part between the recording tracks was 5 nm.

A hard disk drive (HDD) to which the patterned media had been mounted was manufactured, and head output signals were measured with an oscilloscope. As a result, the amplitude of the burst signals was 40 mA. When a heat-run test was carried out at 100° C., the drive was on the sixth day.

In the drive using the discrete track media in Comparative Example 2 in which the recesses are formed between the recording tracks, when a head crash is brought about, the lubricant preserved in the recesses between the recording tracks is replenished.

Therefore, the drive exhibits improved head crash resistance as compared with the drive using the patterned media whose surface is flat in Comparative Example 1. Further, the drive using the discrete track media in Example 2 in which the recesses are formed in the burst part with different two levels in depth exhibits more improved head crash resistance, as compared with the drive using the discrete track media in Comparative Example 2.

Example 3

A stamper in which the marks of preamble, address, and burst in the servo areas, and discrete bits in the recording tracks are formed of recessed patterns by electron beam lithography was prepared. Using the stamper, a discrete bit media shown in FIG. 4 was manufactured by the method shown in FIGS. 7A to 7H. The burst mark in the manufactured patterned media had a size of 180 nm in one side, and the discrete bit had a size of 150 nm×50 nm.

In this discrete bit media, the recording track part had the same cross-sectional structure as that of the burst part. Namely, given that a depth from the surface of the discrete bit to the surface of the nonmagnetic material filled in the first central part between the discrete bits adjacent to each other in the cross-track direction or the down-track direction is $D_b$, and a depth from the surface of the discrete bit to the surface of the nonmagnetic material filled in the second central part at the portion surrounded by the four discrete bits is $D_a$, the depth $D_a$ was deeper than the depth $D_b$.

A hard disk drive (HDD) to which the discrete bit media had been mounted was manufactured, and head output signals were measured with the oscilloscope. As a result, amplitude of the burst signals was 60 mA. After a heat-run test was carried out at 100° C. over a period of a week, the head output signals were measured again with the oscilloscope. As a result, amplitude of the burst signals was 60 mA, and no change was observed. In this way, it was found that there was no degradation in the burst signals even after the heat-run test. Further, there was no damage in the drive.

Example 4

A nano-patterned media in which the marks of preamble, address, and burst in the servo areas, and magnetic dots in the recording tracks are formed of recessed magnetic patterns as shown in FIG. 5 was manufactured by the method shown in FIGS. 8A to 8H. Each recording track includes two lines of sub-tracks in which magnetic dots of 40 nm in diameter are arrayed at a pitch P in the down-track direction and in which positions of the magnetic dots on the two sub-tracks are shifted by a half of the pitch P. The burst mark had a size of 180 nm in one side.

A hard disk drive (HDD) to which the discrete track media (nano-patterned media) had been mounted was manufactured, and head output signals were measured with the oscilloscope. As a result, amplitude of the burst signals was 60 mA. After a heat-run test was carried out at 100° C. over a period of a week, the head output signals were measured again by an oscilloscope. As a result, amplitude of the burst signals was 60 mA, and no change was observed. In this way, it was found that there was no degradation in the burst signals even after the heat-run test. Further, there was no damage in the drive.

Example 5

A discrete track media was manufactured by the same method as that in Example 2. When the depths of recesses on the surface of the patterned media were measured with the AFM, it was found that $D_a$ was 10 nm and $D_b$ was 5 nm.

Figure 10A:
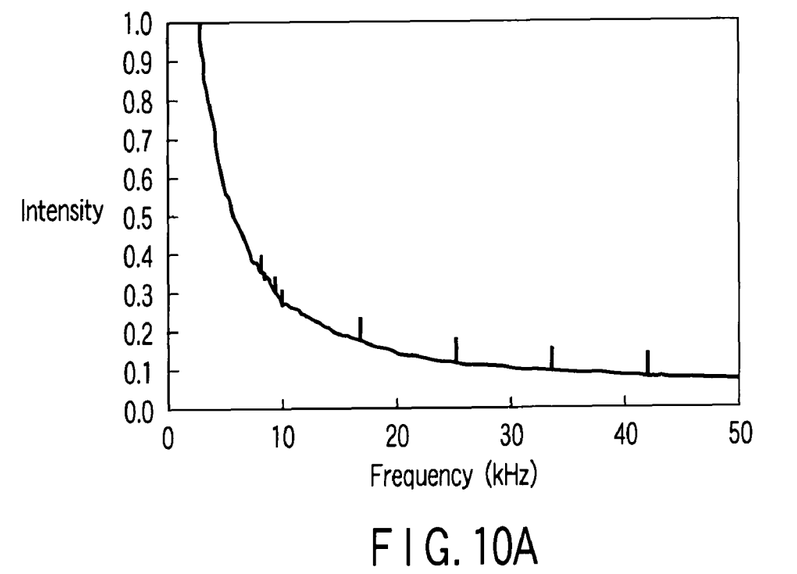
FIGS. 10A and 10B are graphs showing spectra of vibrations of a read/write head with respect to the discrete track media in Example 5 and Comparative Example 3, respectively, which are measured with a laser-Doppler vibrometer.

Vibration of the read/write head with respect to the discrete track media was measured with a laser-Doppler vibrometer (LDV). As a result, a spectrum shown in FIG. 10A was obtained. This spectrum shows that there was no vibration in the head.

Various discrete track media with different values of ($D_a - D_b$) were manufactured by adjusting the depth $D_a$ and the depth $D_b$ by a similar method to that in Example 2 except that the thickness of carbon was changed in the process of filling carbon as a nonmagnetic material in between the magnetic patterns by sputtering, which is shown in FIG. 7F.

Vibration of the read/write head with respect to each discrete track media was measured with the LDV. As a result, it was found that there was no vibration in the head in the case where ($D_a - D_b$)≦10 nm.

Comparative Example 3

A discrete track media was manufactured by a similar method to that in Example 2 except that the thickness of carbon was made 50 nm in the process of filling carbon as a nonmagnetic material in between the magnetic patterns by sputtering, which is shown in FIG. 7F. When the depths of recesses on the surface of the patterned media were measured with the AFM, it was found that $D_a$ was 20 nm and $D_b$ was 8 nm.

Figure 10B:
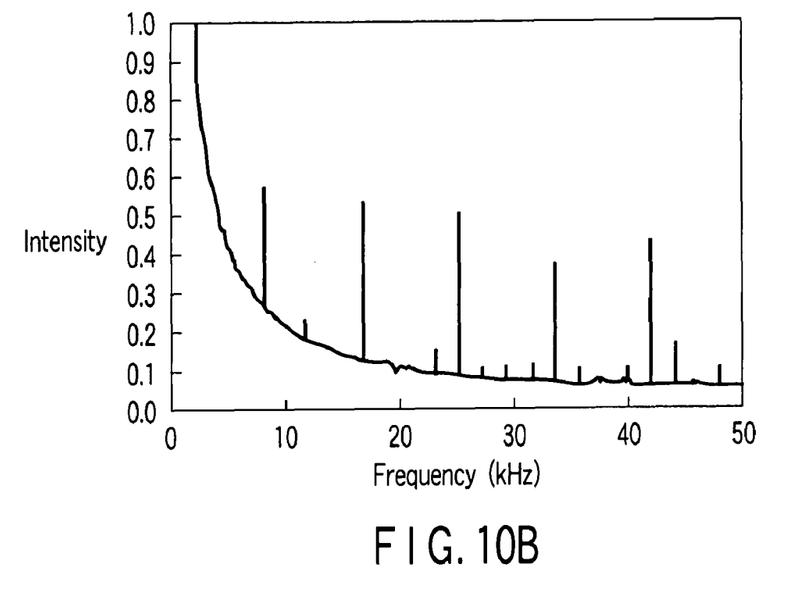

Vibration of a read/write head with respect to the discrete track media was measured with the LDV. As a result, a spectrum shown in FIG. 10B was obtained. In FIG. 10B, clear vibration peaks appeared at frequencies every 9 kHz interval.

The reason for this is that, when the disk was rotated at 4200 rpm, the magnetic head had gone down and vibrated perpendicularly at 180 servo sectors per cycle. When the magnetic head is vibrated, not only a head crash is caused, but also the SNR of servo signals is degraded, which makes it impossible to use the media as a product.

Example 6

A discrete track media was manufactured by the same method as that in Example 2. The burst mark in the manufactured patterned media had a size of 180 nm in one side, and the track had a width of 150 nm.

When the servo characteristics were evaluated from burst signals, the head positioning accuracy was 8 nm. This is sufficient positioning accuracy as a magnetic recording apparatus.

Comparative Example 4

A discrete track media was manufactured by a similar method to that in Example 2 except that a stamper in which protruded patterns corresponding to burst marks had been formed was used.

In this discrete track media, the burst marks were formed of a nonmagnetic material filled in the recessed part provided in the ferromagnetic layer. The burst mark in the manufactured patterned media had a size of 220 nm in one side, and the track had a width of 150 nm.

When the servo characteristics were evaluated from burst signals, the head positioning accuracy was degraded to be 20 nm. This is because side etching was brought about in processing the magnetic patterns, and the patterns formed on the discrete track media were made to have sizes greater than those of the patterns written in the stamper. When the size of the burst marks were great, boundaries between the signals of two burst marks adjacent to each other was made indefinite, making the head positioning accuracy greatly degraded.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A patterned medium comprising:
    a substrate; and
    a magnetic recording layer on the substrate including protruded magnetic patterns and a nonmagnetic material filled in between the protruded magnetic patterns,
    a depth Db and a depth Da, which are defined that Db is a depth from a surface of the magnetic patterns to a surface of the nonmagnetic material filled in a first central part between the magnetic patterns adjacent to each other in a cross-track direction or a down-track direction, and Da is a depth from a surface of the magnetic patterns to a surface of the nonmagnetic material filled in a second central part in a portion surrounded by four magnetic patterns, having a relationship that the depth Da is greater than the depth Db.

2. The medium according to claim 1, wherein the magnetic recording layer has burst marks formed of protruded magnetic patterns.

3. The medium according to claim 1, wherein the magnetic recording layer has discrete tracks formed of protruded magnetic patterns.

4. The medium according to claim 1, wherein the magnetic recording layer has recording tracks including discrete bits formed of protruded magnetic patterns.

5. The medium according to claim 1, wherein the magnetic recording layer has recording tracks including a plurality of lines of sub-tacks in which magnetic dots formed of protruded magnetic patterns are arrayed at a pitch P in a down-track direction and in which positions of the magnetic dots on adjacent two sub-tracks are shifted by a half of the pitch P.

6. The medium according to claim 1, wherein a difference of the depths (Da−Db) is 1 nm or more and 10 nm or less.

7. The medium according to claim 1, wherein the nonmagnetic material is selected from the group consisting of $SiO_2$, $TiO_x$, $Al_2O_3$, $Si_3N_4$, AlN, TiN, TiC, BN, C, and Si.

8. A magnetic recording apparatus comprising:
    the patterned medium according to claim 1; and
    a magnetic head.

* * * * *